(12) United States Patent  (10) Patent No.: US 12,264,653 B2
Martin  (45) Date of Patent: Apr. 1, 2025

(54) LIGHTNING PROTECTION COVERING

(71) Applicant: Wichita State University, Wichita, KS (US)

(72) Inventor: Billy Martin, Wichita, KS (US)

(73) Assignee: WICHITA STATE UNIVERSITY, Wichita, KS (US)

(*) Notice: Subject to any disclaimer, the term of this patent is extended or adjusted under 35 U.S.C. 154(b) by 0 days.

(21) Appl. No.: 17/929,168

(22) Filed: Sep. 1, 2022

(65) Prior Publication Data

US 2022/0412319 A1 Dec. 29, 2022

Related U.S. Application Data

(63) Continuation of application No. PCT/US2021/020675, filed on Mar. 3, 2021.

(60) Provisional application No. 62/984,497, filed on Mar. 3, 2020.

(51) Int. Cl.
*F03D 80/30* (2016.01)
*B29D 99/00* (2010.01)
*F03D 1/06* (2006.01)

(52) U.S. Cl.
CPC ......... *F03D 80/30* (2016.05); *B29D 99/0025* (2013.01); *F03D 1/0675* (2013.01); *F05B 2230/23* (2013.01); *F05B 2230/80* (2013.01); *F05B 2240/306* (2020.08)

(58) Field of Classification Search
CPC ... F03D 80/30; F03D 1/0675; B29D 99/0025; F05B 2230/23; F05B 2230/80; F05B 2240/306
See application file for complete search history.

(56) References Cited

U.S. PATENT DOCUMENTS 3,989,984 A * 11/1976 Amason ................. B64D 45/02
244/1 A
4,329,731 A * 5/1982 Meulenberg, Jr. ..... B64D 45/02
428/922
4,628,402 A * 12/1986 Covey .................... B64D 45/02
361/218

(Continued)

FOREIGN PATENT DOCUMENTS

CN 102661240 A1 9/2012
WO 2011080177 A 7/2011

(Continued)

OTHER PUBLICATIONS

International Search Report and Written Opinion, Application No. PCT/US21/20675, dated Mar. 3, 2021, 15 pages.

*Primary Examiner* — Matthew T Largi
(74) *Attorney, Agent, or Firm* — Stinson LLP (57) ABSTRACT

A protective covering can protect a surface of a composite article from lightning strikes, wherein the surface includes at least one grounding connection. The covering includes a conductive sheet formed from electrically conductive material configured to be affixed to the composite article over a portion of the surface adjacent the grounding connection; and a perforated overlaminate sheet comprising a dielectric material configured to be affixed to the composite article over the conductive sheet. The perforated overlaminate sheet distributes electrical current of the lighting strikes over an area of the protective covering.

27 Claims, 4 Drawing Sheets

(56) References Cited

U.S. PATENT DOCUMENTS

| | | | | |
|---|---|---|---|---|
| 4,796,153 | A * | 1/1989 | Amason | B64D 45/02 |
| | | | | 244/1 A |
| 4,797,325 | A * | 1/1989 | Verdin | B05D 5/12 |
| | | | | 428/689 |
| 2008/0181755 | A1 | 7/2008 | Livingston et al. | |
| 2009/0210103 | A1* | 8/2009 | Cook | B64C 23/005 |
| | | | | 701/3 |
| 2010/0108342 | A1 | 5/2010 | Shimp et al. | |
| 2011/0186206 | A1 | 8/2011 | Ackerman et al. | |
| 2012/0003094 | A1 | 1/2012 | Hansen | |
| 2012/0003495 | A1* | 1/2012 | Cavaliere | B32B 3/266 |
| | | | | 428/596 |
| 2013/0105190 | A1 | 5/2013 | Knyazev et al. | |
| 2013/0149153 | A1 | 6/2013 | Fujioka et al. | |
| 2013/0271891 | A1 | 10/2013 | Shimp et al. | |
| 2013/0309579 | A1 | 11/2013 | Shimp et al. | |
| 2014/0186189 | A1 | 7/2014 | Stege | |
| 2018/0328346 | A1* | 11/2018 | Martin | B32B 38/1808 |

FOREIGN PATENT DOCUMENTS

| | | |
|---|---|---|
| WO | 2014124642 A1 | 8/2014 |
| WO | 2014200333 A1 | 12/2014 |
| WO | 2015055215 A1 | 4/2015 |

* cited by examiner

LIGHTNING PROTECTION COVERING

FIELD OF THE DISCLOSURE

This specification generally describes protective coverings to protect surfaces from lightning strikes, such as coverings to protect wind turbine blade surfaces.

BACKGROUND

In general, wind turbines include blades that are attached to a rotor and generator. The blades can have angled surfaces, similar to a propeller, that cause the blades and the rotor to rotate as wind passes by the blades, which in turn causes the generator to generate electricity from the rotation. The amount of electricity generated by wind turbines can be proportional to the strength and consistency of wind passing by the wind turbines. For example, a first environment with stronger and more consistent wind can permit a wind turbine located in that environment to generate more electricity than a second environment with weaker and less consistent wind. Stronger and more consistent wind can generally be found at higher altitudes. However, having structures at higher altitudes, such as wind turbine structures, can increase the likelihood that those structures will be struck by lightning and/or exposed to strong electric fields as lightning storms pass by.

Wind turbines, tall structures, and other structures susceptible to lightning strikes have been designed to include grounding connections to divert the electrical discharge from a lightning strike to ground without passing through the structure itself. For example, wind turbines have been designed to include lightning receptors or arresters (e.g., plugs) that are inserted into the blade surface and that connect to a bus/wire leading to the ground. When lightning strikes a wind turbine blade with such a lightning receptor, lightning can safely travel through the receptor and bus/wire to ground instead of passing through the blade, turbine, and tower structures of a wind turbine and minimize the potential damage to electrical components that are contained within those structures.

SUMMARY OF THE DISCLOSURE

This disclosure generally describes protective coverings that can be applied to surfaces to direct electricity from lightning strikes (and/or to other events with strong electrical fields, such as passing lightning storms) to ground and/or to grounding connections (e.g., lightning receptors) that are connected to ground. Such protective coverings can conduct and divert electricity away from the surfaces they cover that, without the protective covering, would have to serve as a conductor for the electricity to reach ground/grounding connections.

For example, since wind turbine blades have relatively broad surfaces, they may be struck by lightning at various different locations (not the same location each time). This means that, unless a strike directly hits a lightning receptor (or other grounding connection) in a blade, the blade surface will be conducting electricity from the point of the strike to the receptor/arrester device. This can cause damage to the blade surface that may be significant enough to require the entire blade to be replaced, which will cause deactivation of the wind turbine (not generate electricity) and the wind turbine will not be activated until the ongoing repair or replacement of the turbine blade is finished. However, by covering portions of a wind turbine blade with a protective covering, as described herein, electricity can instead be conducted through the protective covering to the lightning receptor device. Previous protective coverings were susceptible to damage upon lightning strikes (e.g., mushrooming or vaporization of the upper layer(s)). However, the present disclosure seeks to minimize damage to the protective covering by causing the lightning to separate into many small streamers before striking the covering. In addition, the present disclosure provides strategies for minimizing erosion of the covering while still enabling the covering to carry the electrical energy as it is conveyed along the article toward a grounding receptor.

Protective coverings described in U.S. Patent Application Publication No. 2018/0328346, which is hereby incorporated by reference in its entirety, include one or more thin layers of material that can be readily and quickly installed/ repaired, yet provide robust protection against electrical events affecting a surface, such as lightning strikes. For example, protective coverings can include two thin layers of conductive material (e.g., metal) that are separated by a dielectric layer. This protective covering structure can attract lightning strikes and conduct electricity to a grounding connection (e.g., lightning receptor) while shielding the underlying surface (to which the protective covering is affixed) from the electricity.

The inventor has recognized that prior protective coverings are prone to being destroyed after a single lightning strike event. A lightning strike will concentrate a tremendous amount of electrical energy along a very small surface area where the lightning enters the covering. And while the covering may be effective to convey that energy to a receptor while shielding the underlying surface, the energy can cause mushrooming and erosion at the point of entry, particularly along the upper conductive layer. Thus, as explained in further detail below, the inventor proposes layering an additional perforated dielectric sheet onto the exposed conductive surface of a covering. The inventor recognized that the perforated dielectric sheet will not absorb the electrical energy. Instead the electrical energy will be directed through the perforations to the underlying conductive material and then carried by the conductive material to the grounding receptor. The perforated dielectric material will thus remain intact after a lightning strike event. The intact perforated layer will hold together the underlying conductive layer. Moreover, the inventor discovered that the perforated layer will cause the lighting to separate into streamers that enter the conductive material through discrete perforations. This causes the electrical energy to flow into the covering through separate parallel paths (the discrete streamers) each imparting only a fraction of the total electrical energy of the lighting to the point of entry. Moreover, the streaming that occurs distributes the point of entry across a larger surface area of the covering than would be the case if the perforated layer were absent. This permits the protective layer to continue to shield a surface across multiple lightning strikes (e.g., divert electricity from the surface to a grounding connection in the surface) without repair of the covering.

In some implementations, a protective covering to protect a surface of a composite article from lightning strikes, wherein the surface includes at least one grounding connection, is provided. The protective covering includes an underlayment comprising one or more sheets of material to be affixed to the composite article over a region of the surface adjacent the grounding connection, the underlayment configured to include at least one layer of conductive material along said region of the surface; and an overlaminate comprising one or more sheets of perforated dielectric material configured to be affixed over the conductive layer. The overlaminate is configured to distribute electrical current of the lightning strikes over an area of the protective covering.

The present disclosure is also directed to a wind turbine blade assembly comprising a wind turbine blade including at least one grounding connection exposed along a blade surface of the wind turbine blade, an underlayment affixed to the wind turbine blade over a portion of the blade surface adjacent the grounding connection, the underlayment comprising a layer of conductive material, and an overlaminate affixed to the blade surface over the underlayment, the overlaminate comprising a layer of dielectric material having a plurality of perforations distributed along the layer through which electrical current of one or more lightning strikes is passable to the underlayment.

A further aspect of the present disclosure is a method of protecting a composite article from lightning strikes, wherein the composite article comprises a surface and a grounding connection exposed along the surface. The method comprises forming an underlayment on the composite article over a portion of the surface adjacent the grounding connection, the underlayment comprising at least one layer of conductive material, and forming an overlaminate on the composite article over the conductive sheet, the overlaminate comprising a dielectric web defining a plurality of perforations distributed along the dielectric web, the electrical current of one or more lightning strikes being passable through the perforations to the underlayment.

Certain implementations can provide one or more of the following advantages. For example, surfaces that are susceptible to lightning strikes, such as wind turbine blades, can be protected in a more efficient and cost effective manner by using protective coverings, which can be readily installed, repaired, and replaced on a surface (e.g., a wind turbine blade surface). Protective coverings can protect against multiple lightning strikes without experiencing erosion or mushrooming from concentration of a strong electric current on a single area, thereby extending the life of each protective covering, reduce the frequency of repair and maintenance operations that need to be performed, and extend the life of surfaces that are being protected.

Coverings can provide lightning protection to surfaces while at the same time having no or minimal impact on the structures that are being protected. For instance, protective coverings can be relatively thin, lightweight, and flexible so that, when affixed to a surface, they follow the contours of the surface without adding much weight or volume to the surface, all while providing protection against multiple lightning strikes. Protective coverings can thus have minimal impact on performance while extending the overall productive performance of surfaces to which they are applied.

Protective coverings can be highly effective at protecting the underlying surface from damage and can be readily installed, repaired, and replaced. The time to install, repair, and replace a protective covering can be under 30 minutes for a typical wind turbine blade. This is significantly less than the time to repair the wind turbine blade itself, which can involve heavy machinery to remove, position, and reattach the blades on the turbine. By reducing the time for installation, repair, and replacement, wind turbines can experience less down time (i.e., time when the turbine is not operational), which can increase the productivity of wind turbines.

Protective coverings can be integrated into the manufacturing process of wind turbine blades, which can add to the efficiency with which protective coverings are deployed on wind turbines.

Other objects and features will be in part apparent and in part pointed out hereinafter.

BRIEF DESCRIPTION OF THE DRAWINGS

Corresponding reference characters indicate corresponding parts throughout the drawings.

DETAILED DESCRIPTION

Figure 1:
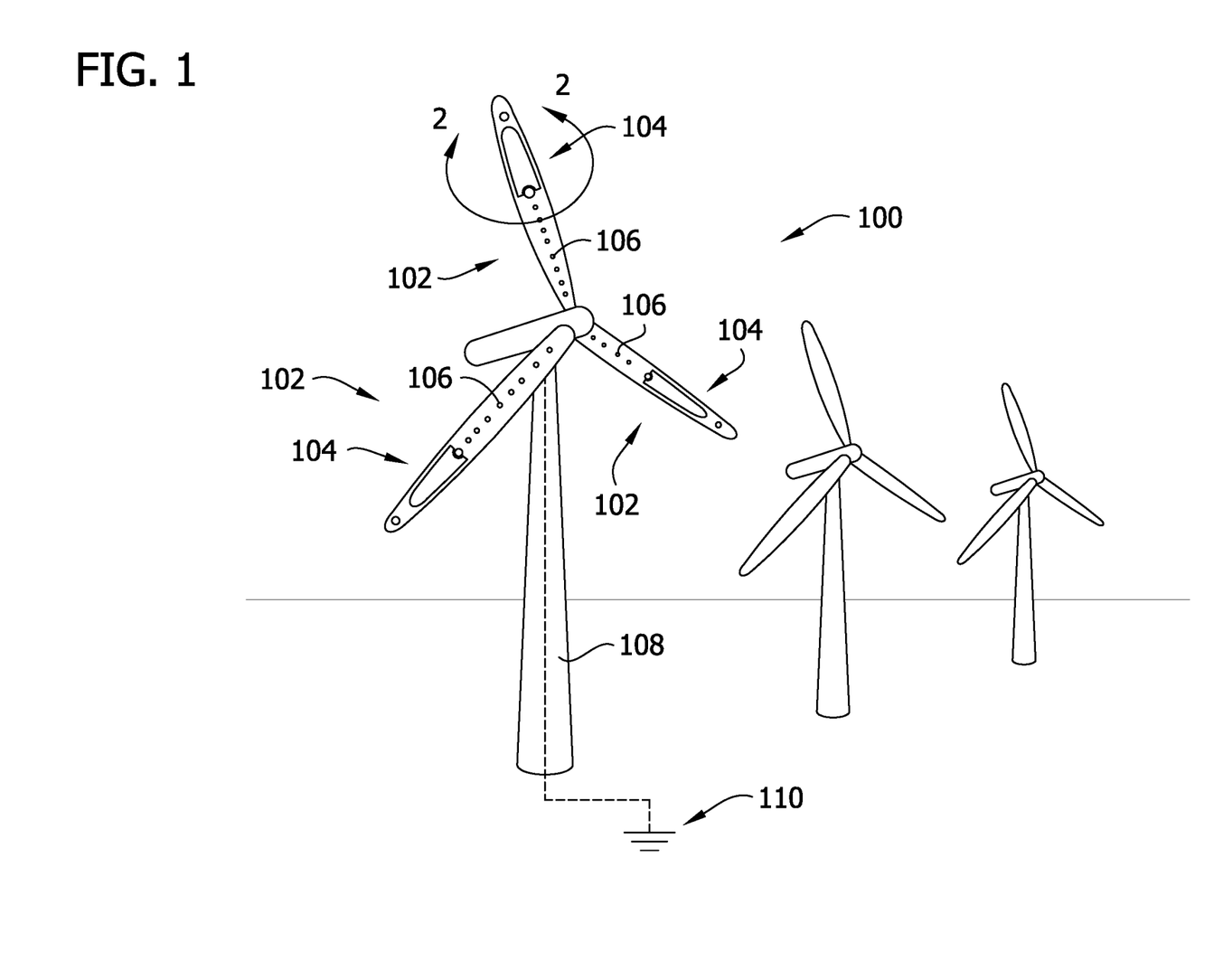
FIG. 1 is a diagram of an example wind turbine with protective covering applied to the blades.

FIG. 1 is a diagram of an example wind turbine 100 with lighting protection coverings 104 applied to blades 102. The protective coverings 104 are provided to protect the surface of the wind turbine blades 102 from damage that may result from lightning strikes or other damage resulting from the existence of strong electric fields around the blades 102, which can result from storms passing by turbine 100.

For example, when a lightning storm passes near a structure, such as the wind turbine 100, the storm can impose a strong electric field on the structure, such as imposing a strong electric field on the turbine 100 and the blades 102. This electric field can be amplified near the blade tips, causing the air by the tip to ionize and form energetic, high-voltage streamers and leaders, which can damage surfaces of the blades 102. The protective coverings 104 can shed this electric field to ground 110 by being positioned on the blades 102 at or around a connection to ground lines 106 (e.g., a lightning receptor and internal bus/wire) within the blades 102 that lead to ground 110 via a grounding bus 108 within the tower of the turbine 100. By transmitting the electric field to ground 110 via the grounding connections 106, the protective covering 104 can protect the blades 102 from damage from such electric fields.

Configuration of the protective coverings 104, their attachment to blades 102, and their interface with grounding connections 106 are described below with regard to FIGS. 2-3. In particular, the area 2 of the blade 102 and protective covering 104 is depicted in FIG. 2, and a cross-sectional view of the blade 102 and covering 104 at line 3-3 is depicted in FIG. 3.

In the illustrated embodiment, each the blade 102 comprises a plurality of grounding connections 112*a*, 112*b* that are longitudinally spaced apart along the length of the respective blade. The blade length extends from a proximal end portion adjacent the hub of the turbine 100 (FIG. 1) to a free distal end portion. In the illustrated embodiment, two grounding connections are shown on each turbine blade 102, a distal grounding connection 112*b* and an adjacent grounding connection 112*a*. It will be understood that other numbers and arrangements of grounding connections may be present without departing from the scope of this disclosure. Each grounding connection 112*a-b* can be, for example, a lightning receptor/arrester that extends through an opening in the surface of blade 102 and that connects to the grounding connection 106, which can be an internal wire or bus within blade 102 that runs to ground 110.

Figure 2:
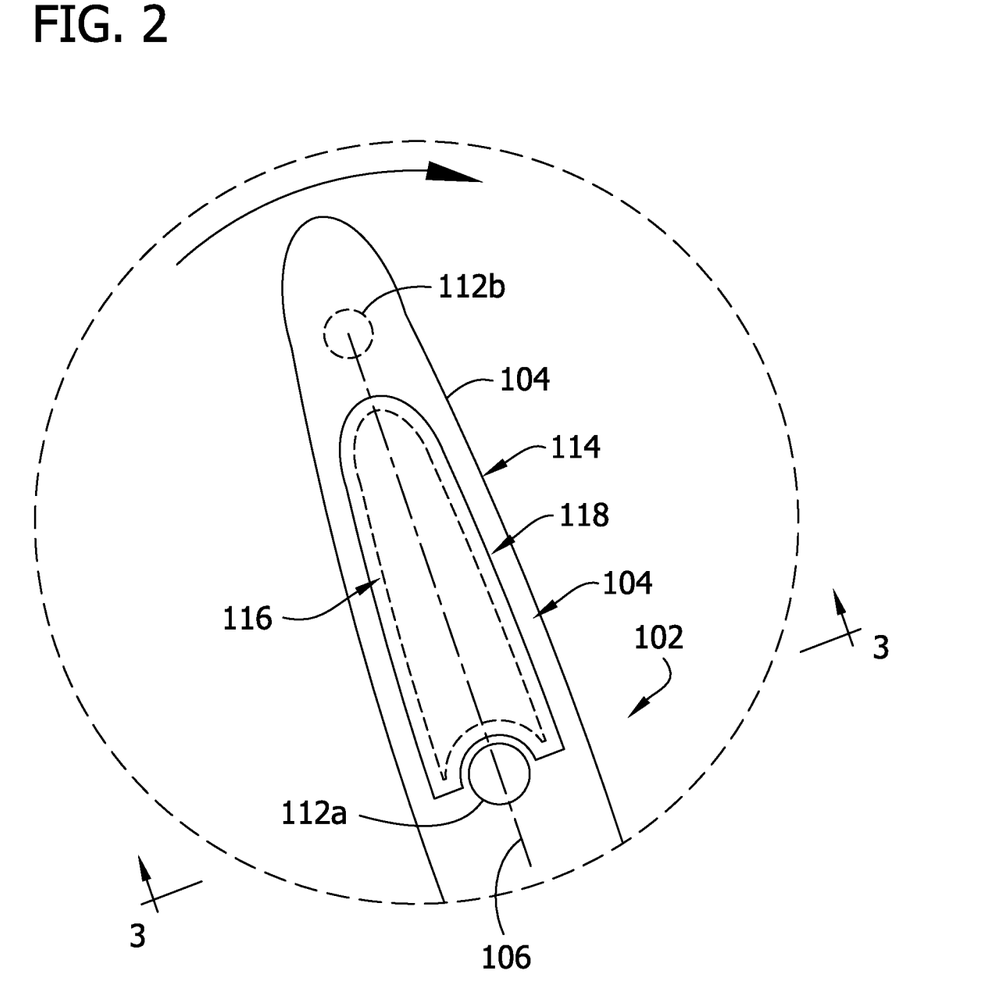
FIG. 2 is a close-up view of a wind turbine blade with a protective covering.
Figure 3:
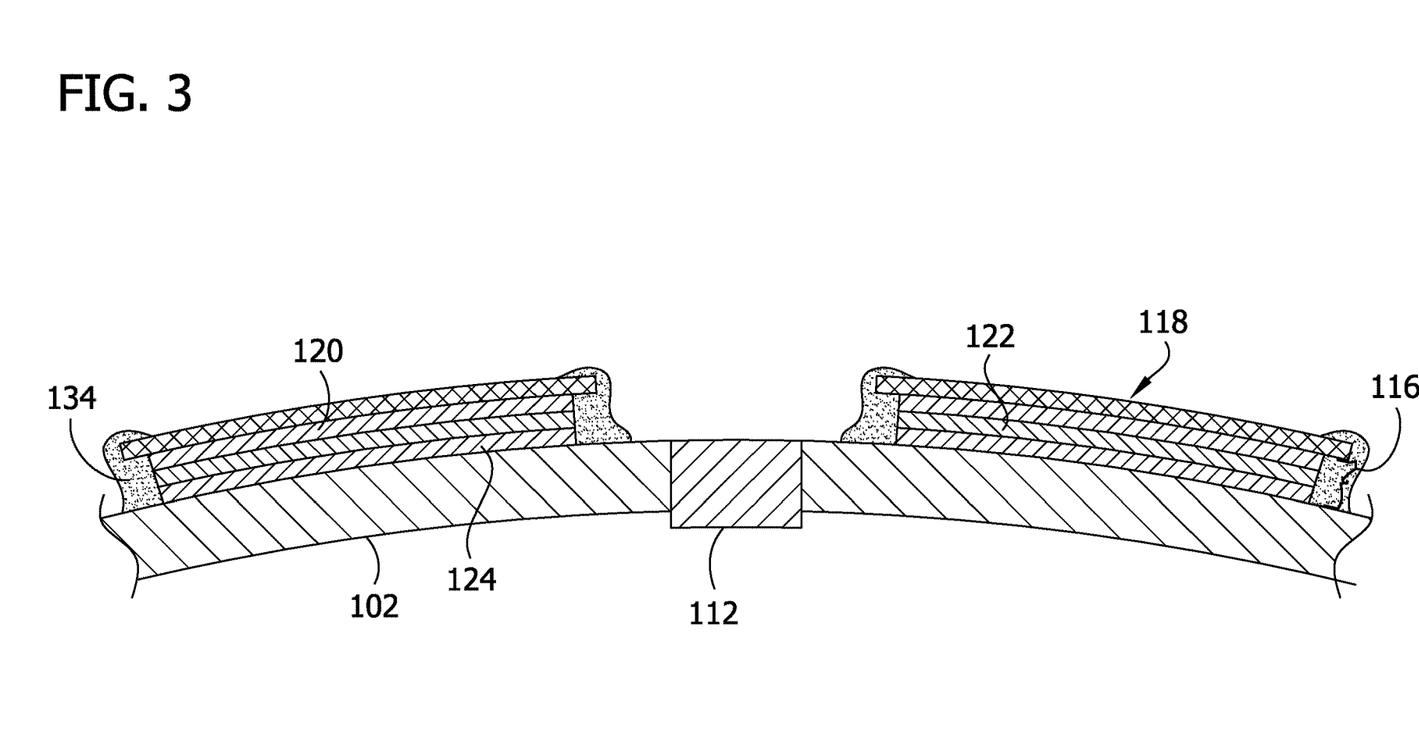
FIG. 3 is a cross-sectional view of a wind turbine blade with a protective covering.

Referring to FIG. 2, the protective covering 104 is applied to a selected surface portion of the blade 102 adjacent a grounding connection 112a. Generally, each protective covering 104 is formed to have an edge located immediately adjacent to the grounding connection 112 so that electricity can travel through the protective covering 104 to the ground connection 112, instead of travelling along the surface of the blade 102, which could damage blade 102. By applying the protective covering 104 to the blade 102, blade 102 can avoid damage that may be caused by high electrical fields travelling along the surface of the blade 102.

The illustrated protective covering 104 extends from a proximal end portion that overlaps the grounding connection 112a along the length of the blade 102 to a distal end portion that stops short of the distal grounding connection 112b. Applying the protective covering along a selected length of the wind turbine blade such that the distal end portion of the covering is spaced apart proximally of the distal grounding connection 112a is thought to enhance the performance of the covering for wind turbine blades that include carbon fiber sparring. However, in one or more embodiments in which the wind turbine blade comprises sparring formed from materials other than carbon fiber, the protective covering can overlap a portion or all of the distal grounding connection. In the illustrated embodiment, the protective covering is formed (e.g., cut, notched) so that it does not cover the top of any grounding connection. It is understood, however, that one or more layers of the covering can overlie the top of the grounding connection without departing from the scope of the disclosure.

In certain embodiments, the protective covering 104 can be wrapped around blade 102 so that an electrical field applied to any side of blade 102 can travel along covering 104 and to ground 110 via the grounding connections 112a-b and 106. However, in the illustrated embodiment, the protective covering 104 is applied to only one side of the blade, e.g., the side of the blade along which a row of receptors 112a-112b are exposed. The protective covering 104 can comprise relatively thin and lightweight material. As will be explained in further detail below, at least a portion (e.g., a layer or ply) of the protective covering 104 comprises an unbroken layer of highly conductive material, such as copper or aluminum, so that the electricity of a lighting strike flows through the conductive material along the surface of the blade. As described in greater detail below, the illustrated protective covering 104 is formed from at least two layers of material that, when combined, can not only shield the blade 102 from damage due to high electrical fields, but can also be resilient and continue to provide such protection over multiple electrical events, such as multiple lightning strikes on the protective covering 104 without significant erosion.

Although the protective covering 104 is depicted as being applied to the middle portion of blade 102, it can additionally and/or alternatively be applied to other regions of the blade 102 and/or wind turbine 100. For example, the protective covering 104 can be applied to a proximal base region of blade 102 (region near the connection between the blade 102 and the turbine), to a different region between the base and the tip of blade 102, to a tip region of blade 102, or a combination thereof. The protective covering 104 can be applied at or around grounding connections that are exposed through and/or on the exterior surface of the blade 102, such as the grounding connection 112a, and should be applied so that there is a second grounding connection 112b that is spaced apart from protective covering 104.

Referring to FIG. 3, which shows a cross-sectional view of the blade 102 at line 3-3 of FIG. 2, the protective covering 104 includes two primary components, an underlayment 116 affixed to the blade 102 directly on a surface of the blade and an overlaminate 118 affixed to the blade over the underlayment. In general, the underlayment 116 comprises at least one contiguous layer of conductive material along the defined surface region of the blade to which the covering 104 is applied, which can carry the electricity of a lighting strike along the surface of the blade to a grounding connection 112 adjacent the covering 104. As will be explained in further detail below, overlaminate 118 generally comprises a layer of dielectric material having a plurality of perforations distributed along the layer. The overlaminate 118 is generally configured so that the electrical current of one or more lightning strikes is passable to the underlayment through the perforations.

In the illustrated embodiment, the underlayment 116 comprises three layers of material, an upper conductive layer 120, a dielectric layer 122, and a lower conductive layer 124. In one or more embodiments, the underlayment 116 may comprise a multilayer protective covering as disclosed in U.S. Patent Application Publication No. 2018/0328346, which was previously incorporated by reference. Each of the layers 120, 122, 124 may be applied as a separate sheet of material as disclosed in U.S. Patent Application Publication No. 2018/0328346. Thus, the lower conductive layer 124 can be affixed to the surface of the blade 102, the dielectric layer 122 can be affixed to base layer 124, the upper conductive layer 120 can be affixed to the dielectric layer 122, and the perforated overlaminate 118 can be affixed to upper conductive layer 120. It is contemplated that the underlayment 116 may be formed from pre-fabricated sheet material that includes the upper conductive layer 120, the dielectric layer 122, and the lower conductive layer 124. Thus, in one or more embodiments, a single sheet of prefabricated multilayer composite material may be cut to size and affixed to the blade 102 to form the underlayment 116. The conductive layers 120, 124 can be, for example, highly conductive materials (e.g., metals, such as copper and/or aluminum) that are bonded together by the dielectric layer 122, which can be, for example, an electrically insulating material, such as a polyimide film with a silicone adhesive (e.g., KAPTON tape). Although the illustrated embodiment utilizes a multilayer underlayment it will be understood that underlayments formed from a single layer of conductive material are also possible within the scope of this disclosure. Still other underlayment configurations may also be possible, particularly if they include conductive material capable of carrying electricity along the surface of the blade to a grounding connection.

The conductive upper and base layers 120, 124 can be relatively thin, such as between 0.005 inches and 0.02 inches (0.12 mm and 0.51 mm), between 0.005 inches and 0.01 inches (0.12 mm and 0.25 mm), and/or any other ranges of thickness. The conductive upper layer 120 can be less than or equal to the thickness of the conductive base layer 124. For example, the conductive upper layer 120 can have a thickness of between 0.005 inches and 0.008 inches (0.12 mm and 0.21 mm), between 0.005 inches and 0.01 inches (0.12 mm and 0.25 mm), and/or other ranges of thickness, and the conductive base layer 124 can have a thickness of between 0.005 inches and 0.02 inches (0.12 mm and 0.51 mm), between 0.005 inches and 0.01 inches (0.12 mm and 0.25 mm), and/or other ranges of thicknesses. Other absolute and relative thicknesses of the upper conductive layer 120 and the base conductive layer 124 are also possible.

The perforated overlaminate 118 comprises a dielectric material and can be, for example, a thermoplastic polymer, such as a thermoplastic fluoropolymer. In various examples, the thermoplastic polymer comprises polyvinylidene fluoride (PVDF), polyvinyl fluoride (PVF), or a combination thereof. In various examples, the perforated overlaminate 118 comprises any substantially clear thermoplastic polymer. Alternatively, the perforated overlaminate 118 can comprise a substantially opaque thermoplastic polymer. Using an opaque thermoplastic polymer can assist with solar reflectivity, the overall life of the overlaminate, and general aesthetics of the protective covering. The perforated overlaminate 118 can further comprise an adhesive layer, for example, an acrylic adhesive.

Figure 4:
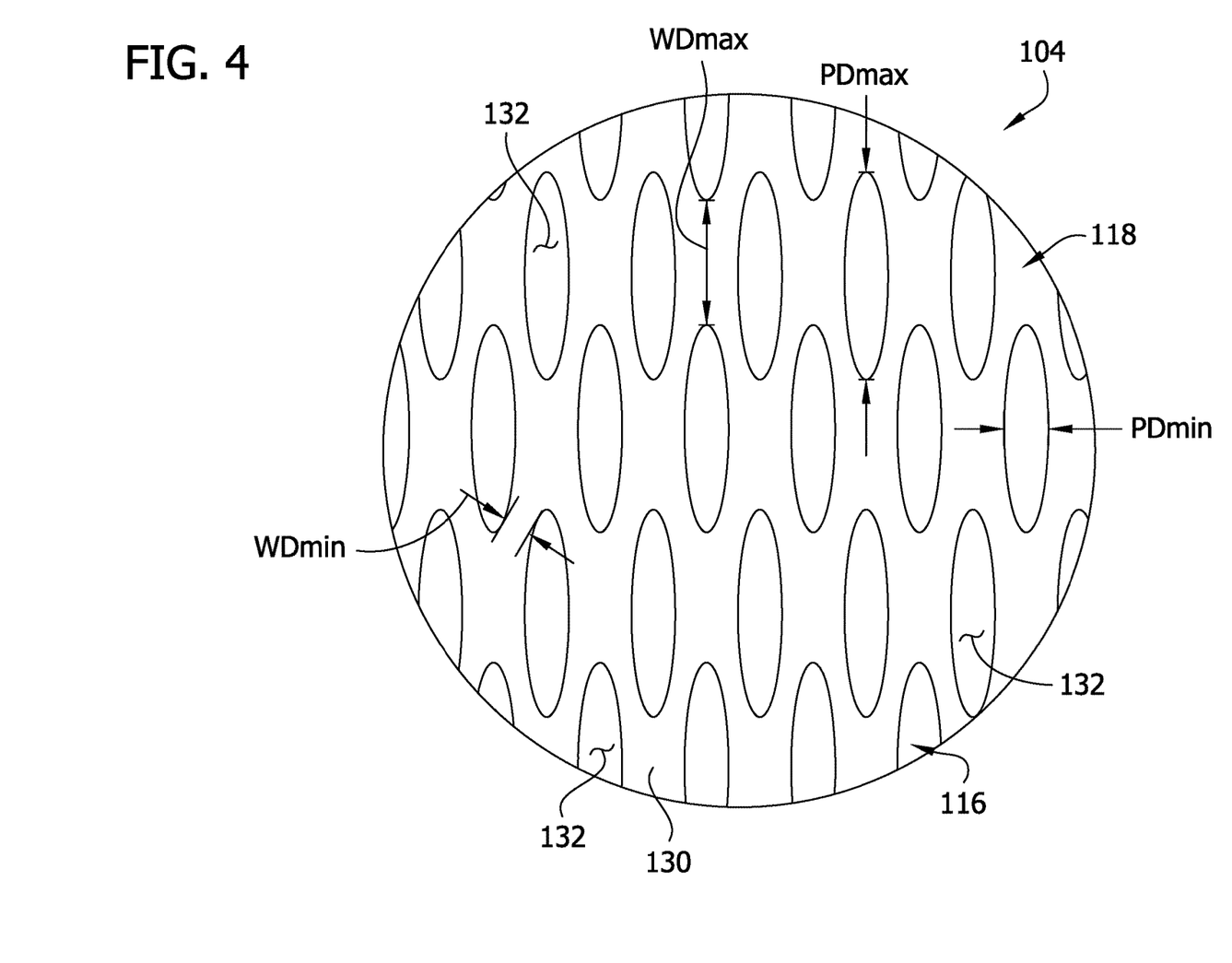
FIG. 4 is an enlarged view of a portion of FIG. 2.

The perforated overlaminate 118 can comprise a one or more sheets of perforated dielectric material. If more than one sheet is used, the sheets can be arranged edge-to-edge with little to no overlap along the adjacent edge margins of the sheets of perforated dielectric material. Thus, in one or more embodiments, the overlaminate comprises a single layer of perforated dielectric sheet material. Referring to FIG. 4, the illustrated overlaminate comprises a dielectric web 130 that defines a plurality perforations 132. The web 130 extends circumferentially around the entire perimeter edge margin of each discrete perforation 132. In the illustrated embodiment, the perforations are uniform in size and shape and are regularly spaced apart along the layer of perforated dielectric material (e.g., the perforations are regularly spaced along the length and the width of the overlaminate). It is also contemplated, however, that the perforations can be varied in size, shape, and distance across the surface of the layer, in one or more embodiments.

The perforations 132 can comprise any suitable shape. For example, the perforations can be square, rectangular, circular, polygonal, oval, or any other desired shape. The perforations can be in staggered rows or in straight rows. In the illustrated embodiment, each perforation is generally oval-shaped. Each perforation 132 has a major internal dimension PDmax along a major axis and a minor internal dimension PDmin along a minor axis. In certain embodiments, the major internal dimension is greater than the minor internal dimension. In one or more embodiments, the major internal dimension PDmax is in an inclusive range of from about 0.25 mm to about 10 mm (e.g., an inclusive range of from about 0.35 mm to about 8 mm, an inclusive range of from about 0.45 mm to about 6 mm, an inclusive range of from about 0.5 mm to about 5 mm, an inclusive range of from about 0.6 mm to about 4 mm, an inclusive range of from about 0.7 mm to about 3 mm, or an inclusive range of from about 0.8 mm to about 2 mm). In one or more embodiments, the minor internal dimension PDmax is in an inclusive range of from about 0.25 mm to about 10 mm (e.g., an inclusive range of from about 0.35 mm to about 8 mm, an inclusive range of from about 0.45 mm to about 6 mm, an inclusive range of from about 0.5 mm to about 5 mm, an inclusive range of from about 0.6 mm to about 4 mm, an inclusive range of from about 0.7 mm to about 3 mm, or an inclusive range of from about 0.8 mm to about 2 mm). In certain embodiments, any two adjacent perforations 132 on the overlaminate 118 have a maximum spacing distance between closest points WDmax in an inclusive range of form about 0.25 mm to about 10 mm (e.g., an inclusive range of from about 0.35 mm to about 8 mm, an inclusive range of from about 0.45 mm to about 6 mm, an inclusive range of from about 0.5 mm to about 5 mm, an inclusive range of from about 0.6 mm to about 4 mm, an inclusive range of from about 0.7 mm to about 3 mm, or an inclusive range of from about 0.8 mm to about 2 mm). Likewise, in one or more embodiments, along the overlaminate 118, any two adjacent perforations 132 have a minimum spacing distance between closest points in an inclusive range of from about 0.25 mm to about 10 mm (e.g., an inclusive range of from about 0.35 mm to about 8 mm, an inclusive range of from about 0.45 mm to about 6 mm, an inclusive range of from about 0.5 mm to about 5 mm, an inclusive range of from about 0.6 mm to about 4 mm, an inclusive range of from about 0.7 mm to about 3 mm, or an inclusive range of from about 0.8 mm to about 2 mm). For example, in certain embodiments, adjacent perforations have a minimum spacing distance WDmin of at least about 0.25 mm. In exemplary embodiments, each perforation has an area in an inclusive range of from about 0.5 $mm^2$ to about 5 $mm^2$ (e.g., in an inclusive range of from about 0.5 $mm^2$ to about 4 $mm^2$, an inclusive range of from about 0.5 $mm^2$ to about 3 $mm^2$, an inclusive range of from about 0.5 $mm^2$ to about 3 $mm^2$, an inclusive range of from about 0.5 $mm^2$ to about 2 $mm^2$, or an inclusive range of from about 0.5 $mm^2$ to about 1 $mm^2$). Although the illustrated perforations 132 have elongate round shapes, it is contemplated that the perforations could have other shapes without departing from the scope of the disclosure. For example, the inventor believes that an effective overlaminate can comprise circular perforations with inner diameters of 1 mm±10% that are arranged in staggered rows so that each row extends along a longitudinal axis, the center-to-center spacing distance of perforations within each row is 2 mm±10% and the centers of perforations in adjacent rows are offset along the longitudinal axis by 1 mm±10%. Overlaminates having other arrangements of perforations are also possible without departing from the scope of the disclosure.

The ratio of the total area of the sheet to the total area of the perforations can be, for example, from 90:10 to 50:50, from 80:20 to 50:50, from 70:30 to 50:50, or from 60:40 to 50:50. As an example, about 10%, about 20%, about 30%, about 40%, about 50%, about 60%, about 70%, about 80%, or about 90% of the total area of the overlaminate can be removed by perforations. For example, from about 10% to about 90%, from about 10% to about 80%, from about 10% to about 70%, from about 20% to about 70%, from about 20% to about 60%, from about 30% to about 60%, from about 30% to about 50%, or from about 40% to about 50% of the total area of the overlaminate can be removed by perforations.

The expected exterior life of the perforated overlaminate 118 can be at least about 3 years, for example, at least about 4 years, at least about 5 years, at least about 6 years, at least about 7 years, at least about 8 years, at least about 9 years, or at least about 10 years. In one or more embodiments, the perforated overlaminate 118 is able to withstand a wide variety of temperatures and weather conditions without significant deterioration. For example, the perforated overlaminate 118 should be able to withstand temperatures as low as −50° C. (e.g., −40° C., −30° C., −20° C., etc.) and as high as 70° C. (e.g., 60° C., 50° C., 40° C., etc.) The particular temperature and weather conditions may vary as the location of the surface (e.g., wind turbine blade) to which the overlaminate changes. For example, in hotter climates, it would be more beneficial to provide an overlaminate able to withstand temperatures on the hotter end of the ranges, whereas in cooler climates, it would be beneficial to provide an overlaminate able to withstand colder temperature ranges.

Referring to FIGS. 2 and 3, the conductive upper layer 120 can be applied to blade 102. The overlaminate 118 is directly affixed to the conductive upper layer 120. Each of the overlaminate 118, conductive upper layer 120, dielectric layer 122, and conductive base layer 124 can be configured to have openings that extend around the ground connection 112 so that these layers do not overlap the grounding connection 112.

By using the perforated overlaminate 118 in combination with the three-layer (120-124) underlayment 116, the protective covering 104 can effectively transfer the current to the grounding connection 112a from multiple lightning strikes without needing to be repaired or replaced. In general, the overlaminate is configured to direct the electrical current of a lighting strike to flow into the underlayment 116 through the perforations 132 instead of the dielectric web 130. That is, electrical current can pass into the underlayment 116 with less resistance when it flows through the perforations 132 rather than the web 130 so it will tend to preferentially flow through the perforations rather than the web. The inventor has discovered that, since the perforations are of limited size and are separated by highly electrically insulating material, the overlaminate will cause lighting to separate into discrete streamers that pass into the underlayment 116 through separate ones of the perforations. The streamers form parallel paths for the electricity of the lighting strike to flow into the underlayment. Thus, each streamer contains only a fraction of the current of the entire lightning strike. Furthermore, the streamers distribute themselves over a much larger surface area than would a lightning strike imparted on the underlayment 116 without the overlaminate. As a result, the overlaminate effectively distributes the electrical energy of the lighting strike over the surface area of the underlayment so that underlayment is not destroyed by the lighting strike. Moreover, to the extent that any slight mushrooming or damage of the underlayment occurs, the web 130 of the overlaminate is not affected and thus functions to hold the underlayment together, mitigating erosion.

Referring again to FIGS. 2 and 3, in the illustrated embodiment, the overlaminate has a slightly larger surface area than the underlayment. That is, the underlayment has a perimeter edge margin (shown in dotted line in FIG. 2) and the overlaminate has a perimeter edge margin that overhangs the perimeter edge margin of the underlayment. Sizing the underlayment and overlaminate in this way is thought to improve the overlaminate's performance in inhibiting erosion of the underlayment. The perimeter edge margin of the overlaminate can be sealed directly to the surface of the blade 102, which is thought to inhibit the peeling of the underlayment at the perimeter edge margin thereof. In the illustrated embodiment, caulk 134 seals the perimeter edge margin of the overlaminate 118 to the blade 102. As will be explained in further detail below, the caulk may be applied to the top surface of the overlaminate and then be pressed through the perforations 136 to fully seal the perimeter edge margins of both the overlaminate and the underlayment 116 and join them securely to the surface of the blade 102.

The protective covering 104 can be readily installed, repaired, and/or replaced, which can make it cost-effective to install and maintain over time as a protective layer for a structure. For instance, layers 118-124 can be relatively thin (e.g., between 0.005 inches and 0.02 inches (0.12 mm and 0.51 mm), between 0.005 inches and 0.01 inches (e.g., 0.12 mm and 0.25 mm), and/or other ranges of thicknesses), which can make them easy to cut, position, and affix to surfaces, such as the blade 102. For example, the conductive layers 120, 124 can be thin copper tape/sheets that is readily affixed to the blade 102 and the dielectric layer 122 with adhesive. The dielectric layer 122 can similarly be a thin layer that is easy to apply as part of the protective covering 104, such as a dielectric tape/sheet that is readily affixed to the conductive layers 120, 124. The perforated overlaminate 118 can also be a thin layer that is easy to affix to the top of the upper conductive layer 120, typically by way of an adhesive backing on one side of the overlaminate 118. These materials can permit, for example, installation and repair of the protective covering 104 on a standard-sized wind turbine blade in 30 minutes or less. This is significantly less time than the time required to repair the actual body of the blade 102, which can cause the wind turbine 100 to be inoperable and less productive for a longer period of time. Additionally, the cost of materials for the protective covering 104 are significantly less than the blade 102 and/or materials to repair/replace portions of the body of the blade 102, which can make the protective covering 104 a more cost effective solution against lightning strikes.

Although the protective covering 104 is described as being applied to wind turbines 100 and wind turbine blades 102, it can be applied to other surfaces and other structures. For example, the protective covering 104 can be applied to airplanes, buildings, exterior lighting fixtures, and/or other structures and surfaces. Additionally, although the protective covering 104 is described as having four layers, additional layers and/or combinations of layers are also possible. For example, a six-layer protective covering is also possible, with an additional dielectric layer and conductive layer applied to the upper conductive layer 120. Thus, the skilled person will understand that such protective coverings as herein described can be used in covering systems and applied to wind turbine blades or articles other than wind turbine blades. The skilled person will understand how to modify the protective coverings and methods of the present disclosure in order to effectively apply the protective coverings to other articles.

In certain methods of application of the protective covering (e.g., methods of protecting the surface of an article from lightning strikes), each of the layers 120, 122, 124 of the underlayment can be formed from a separate sheet of material or the underlayment is formed from a single sheet of prefabricated multilayer material. This technique can be used, for example, to apply the protective covering 104 to the blade 102 or to apply a protective covering to other surfaces.

The surface to which the protective covering is to be applied can be prepared. The region of the blade 102 between the tip and the base is cleaned and the location of the lightning receptor/arrester plug (example of the lightning connection 112a) is identified.

In embodiments where the underlayment is formed from separate sheets of material, initially a sheet of conductive material is cut to a shape that corresponds to the region to be covered. An opening or notch in the lower conductive layer can be cut to be larger than the grounding connection in the surface, and the lower conductive layer can be affixed to the surface so that the opening aligns with the grounding connection and the conductive material does not directly overlie the grounding connection. The base conductive layer is affixed (e.g., with an adhesive) to the surface of the blade so that the opening or notch in the base conductive layer lines up with the lightning receptor/arrester plug.

Similarly, an opening or notch is cut in the dielectric layer and the dielectric layer is affixed to the lower conductive layer so that the dielectric layer does not overlap the grounding connection. The dielectric layer is affixed to the base conductive layer so that the lightning receptor/arrester plug is exposed through the dielectric layer (e.g., in the notch or opening).

An opening or notch is also cut in the upper conductive layer, and the upper conductive layer is affixed to the dielectric layer and to the grounding connection. The upper conductive layer is affixed to the dielectric layer so that the lightning receptor/arrester plug is exposed through the upper conductive layer (e.g., in the notch or opening).

Where a single sheet of material is used as the underlayment, a prefabricated sheet (e.g., a conductive tape) comprising the upper conductive layer, the dielectric layer, and the lower conductive layer is cut to size as required by the general size of the surface to be covered. In various implementations, this step also requires cutting an opening or notch in the tape or sheet larger than the grounding connection in the surface. The underlayment is then positioned and affixed to the surface. In embodiments where a hole or notch is cut in the tape or sheet, the underlayment can be affixed to the surface so that the tape or sheet does not overlap the grounding connection and is instead exposed by the opening or notch. The underlayment is affixed (e.g., with an adhesive) to the surface of the blade so that the opening in the tape lines up with the lightning receptor/arrester plug.

In either embodiment (i.e., whether the underlayment is applied as a single sheet or as separate sheets), an opening or notch is optionally cut in the perforated overlaminate, and the perforated overlaminate is then affixed to the upper conductive layer. In one embodiment, the overlaminate is affixed to the upper conductive layer so that the lightning receptor/arrester plug is exposed through the overlaminate. The overlaminate can be cut so that it is larger than the perimeter of the underlayment.

The skilled person will understand that the openings or notches cut for the lightning receptor/arrester plugs can be cut either before or after application of the individual layers. Alternatively, the opening in both the underlayment and overlaminate can be cut at the same time after application of all layers.

In some implementations, an erosion covering can be applied to a portion of the surface that will experience greater wear and tear, such as a leading edge of a wind turbine blade. Caulk may also be applied around the outside of the perforated overlaminate to assist with erosion control. Where caulk is applied, a bead of caulk can be laid atop the perimeter edge margin of the overlaminate and pressed through the perforations in order to seal the edge margins of both the overlaminate and underlayment.

Having provided a detailed description of certain exemplary embodiments, it will be apparent that modifications and variations are possible without departing from the scope of the disclosure or the scope of the recitations in the following claims.

When introducing elements of the present disclosure or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the disclosure are achieved and other advantageous results attained.

As various changes could be made in the above products and methods without departing from the scope of the disclosure, it is intended that all matter contained in the above description and shown in the accompanying drawings shall be interpreted as illustrative and not in a limiting sense.

The invention claimed is:

1. A covering system for protecting a surface of a composite article from lightning strikes, wherein the surface includes at least one grounding connection, the covering system comprising:
    an underlayment comprising one or more sheets of material configured to be affixed to the composite article over a region of the surface adjacent the at least one grounding connection, the underlayment configured to include at least one layer of conductive material along said region of the surface; and
    an overlaminate comprising one or more sheets of perforated dielectric material configured to be affixed to the composite article over the at least one layer of conductive material;
    wherein the at least one layer of conductive material comprises a lower conductive layer, the underlayment further comprising a middle dielectric layer formed from electrically insulating material and an upper conductive layer formed from electrically conductive material.

2. The covering system of claim 1, wherein the middle dielectric layer is sandwiched between the upper and lower conductive layers and adhesively bonded thereto.

3. The covering system of claim 1, wherein the underlayment comprises a prefabricated sheet that includes the lower conductive layer, the middle dielectric layer, and the upper conductive layer, the prefabricated sheet being configured to be affixed to the surface of the article as a unit.

4. The covering system of claim 1, wherein the one or more sheets of perforated dielectric material comprises a dielectric web defining a plurality of perforations, the dielectric web being configured to cause each lightning strike to separate into discrete streamers that pass into the underlayment through respective ones of the perforations.

5. The covering system of claim 1, wherein at least about 10% of the total area of the perforated dielectric material is removed by perforations.

6. The covering system of claim 1, wherein each of the one or more sheets of perforated dielectric material has a thickness, a length, a width, and a plurality of perforations through the thickness, the perforations being distributed along the length and the width of the sheet of perforated dielectric material.

7. The covering system of claim 6, wherein each of the one or more sheets of perforated dielectric material comprises web which defines the perforations.

8. The covering system of claim 6, wherein the perforations are regularly spaced along the length and the width of the overlaminate.

9. The covering system of claim 1, wherein the underlayment comprises at least one contiguous layer of conductive material spanning across perforations of the perforated dielectric material.

10. A covering system for protecting a surface of a composite article from lightning strikes, wherein the surface includes at least one grounding connection, the covering system comprising:
    an underlayment comprising one or more sheets of material configured to be affixed to the composite article over a region of the surface adjacent the at least one grounding connection, the underlayment configured to include at least one layer of conductive material along said region of the surface; and an overlaminate comprising one or more sheets of perforated dielectric material configured to be affixed to the composite article over the at least one layer of conductive material; wherein
the underlayment has a perimeter edge margin and the overlaminate has a perimeter edge margin, the perimeter edge margin of the overlaminate being configured to overhang the perimeter edge margin of the underlayment.

11. The covering system of claim 10, further comprising caulk configured to be applied atop the overlaminate to seal the perimeter edge margin of the underlayment and the perimeter edge margin of the overlaminate.

12. A wind turbine blade assembly comprising:
a wind turbine blade including at least one grounding connection exposed along a blade surface of the wind turbine blade;
an underlayment affixed to the wind turbine blade over a portion of the blade surface adjacent the at least one grounding connection, the underlayment comprising a layer of conductive material; and
an overlaminate affixed to the blade surface over the underlayment, the overlaminate comprising a layer of dielectric material having a plurality of perforations distributed along the layer through which electrical current of one or more lightning strikes is passable to the underlayment.

13. The wind turbine blade assembly of claim 12, wherein the underlayment comprises a perimeter edge margin spaced from the grounding connection and the overlaminate comprises a perimeter edge margin spaced from the grounding connection.

14. The wind turbine blade assembly of claim 13, further comprising caulk sealing the perimeter edge margin of the underlayment and the perimeter edge margin of the overlaminate.

15. The wind turbine blade assembly of claim 14, wherein the perimeter edge margin of the overlaminate overhangs the perimeter edge margin of the underlayment.

16. The wind turbine blade assembly of claim 13, wherein the perimeter edge margin of the overlaminate overhangs the perimeter edge margin of the underlayment.

17. The wind turbine blade assembly of claim 12, wherein the underlayment comprises a lower conductive layer, the underlayment further comprising a middle dielectric layer formed from electrically insulating material and an upper conductive layer formed from electrically conductive material.

18. The wind turbine blade assembly of claim 12, wherein the layer of dielectric material is configured to cause a lightning strike to separate into discrete streamers that pass into the underlayment through respective ones of the perforations.

19. The wind turbine blade assembly of claim 12, wherein at least about 20% of the total area of the perforated dielectric material is removed by the perforations.

20. The wind turbine blade assembly of claim 12, wherein the underlayment and the overlaminate comprise a notch cut larger than the grounding connection, said notch positioned adjacent to the grounding connection and not in contact with the grounding connection.

21. A method of protecting a composite article from lightning strikes, wherein the composite article comprises a surface and a grounding connection exposed along the surface, the method comprising:
forming an underlayment on the composite article over a portion of the surface adjacent the grounding connection, the underlayment comprising at least one layer of conductive material;
forming an overlaminate on the composite article over the at least one layer of conductive material the overlaminate comprising a dielectric web defining a plurality of perforations distributed along the dielectric web, the electrical current of one or more lightning strikes being passable through the perforations to the underlayment;
wherein forming the underlayment comprises cutting one or more sheets of prefabricated sheet to size and joining the cut sheets to the surface of the composite article, each prefabricated sheet having a lower conductive layer, a middle dielectric layer, and an upper conductive layer.

22. A method of protecting a composite article from lightning strikes, wherein the composite article comprises a surface and a grounding connection exposed along the surface, the method comprising:
forming an underlayment on the composite article over a portion of the surface adjacent the grounding connection, the underlayment comprising at least one layer of conductive material;
forming an overlaminate on the composite article over the at least one layer of conductive material the overlaminate comprising a dielectric web defining a plurality of perforations distributed along the dielectric web, the electrical current of one or more lightning strikes being passable through the perforations to the underlayment; and
forming the underlayment to have a perimeter edge margin and forming the overlaminate to have a perimeter edge margin that is larger than the perimeter edge margin of the underlayment such that the perimeter edge margin of the overlaminate overhangs the perimeter edge margin of the underlayment.

23. The method of claim 22, further comprising pressing caulk onto the top surface of the perimeter edge margin of the overlaminate.

24. A covering system for protecting a surface of a composite article from lightning strikes, wherein the surface includes at least one grounding connection, the covering system comprising:
an underlayment comprising one or more sheets of material configured to be affixed to the composite article over a region of the surface adjacent the at least one grounding connection, the underlayment configured to include at least one layer of conductive material along said region of the surface; and
an overlaminate comprising one or more sheets of perforated dielectric material configured to be affixed to the composite article over the at least one layer of conductive material;
wherein the underlayment and the overlaminate comprise a notch cut larger than the grounding connection, said notch positioned adjacent to the grounding connection and not in contact with the grounding connection.

25. A covering system for protecting a surface of a composite article from lightning strikes, wherein the surface includes at least one grounding connection, the covering system comprising:
an underlayment comprising one or more sheets of material configured to be affixed to the composite article over a region of the surface adjacent the at least one grounding connection, the underlayment configured to include at least one layer of conductive material along said region of the surface; and an overlaminate comprising one or more sheets of perforated dielectric material configured to be affixed to the composite article over the at least one layer of conductive material;

wherein at least 20% of the total area of the perforated dielectric material is removed by perforations.

26. The covering system of claim 25, wherein 40% of the total area of the perforated dielectric material is removed by perforations.

27. A covering system for protecting a surface of a composite article from lightning strikes, wherein the surface includes at least one grounding connection, the covering system comprising:

an underlayment comprising one or more sheets of material configured to be affixed to the composite article over a region of the surface adjacent the at least one grounding connection, the underlayment configured to include at least one layer of conductive material along said region of the surface; and an overlaminate comprising one or more sheets of perforated dielectric material configured to be affixed to the composite article over the at least one layer of conductive material;

wherein each of the plurality of perforations has an internal dimension ranging from 0.25 mm to 10 mm.

* * * * *